United States Patent [19]
Min

[11] Patent Number: 5,421,785
[45] Date of Patent: Jun. 6, 1995

[54] METHOD OF AND DEVICE FOR POWER TRANSMISSION

[76] Inventor: Kyung-Shik Min, 245-34, Seokchon-Dong, Songpa-Ku, Seoul, Rep. of Korea

[21] Appl. No.: 115,315

[22] Filed: Sep. 1, 1993

[30] Foreign Application Priority Data

Oct. 29, 1992 [KR] Rep. of Korea ............ 92-20065
Dec. 23, 1992 [KR] Rep. of Korea ............ 92-25319

[51] Int. Cl.⁶ ..................................... F16H 59/00
[52] U.S. Cl. ................................. 474/69; 474/70
[58] Field of Search ............... 474/8, 11, 12, 17, 18, 474/28, 69, 70, 71, 72; 192/106.1, 106.2

[56] References Cited

U.S. PATENT DOCUMENTS

| | | | |
|---|---|---|---|
| 3,011,353 | 12/1961 | Friedrich et al. | 474/72 X |
| 3,610,062 | 12/1969 | Hoff | 474/70 |
| 3,721,132 | 3/1973 | Johnson | 474/71 X |
| 4,269,296 | 5/1981 | Flotow et al. | 192/106.2 |
| 4,305,326 | 12/1981 | Sallach et al. | 89/33 |
| 4,740,191 | 4/1988 | Takano et al. | 474/69 |
| 4,950,208 | 8/1990 | Tomlinson | 474/71 |

*Primary Examiner*—Michael Powell Buiz
*Attorney, Agent, or Firm*—Nawrocki, Rooney & Sivertson

[57] ABSTRACT

Method of and device for power transmission using a circulating fluid under pressure delivered from a hydraulic pump in proportion to the number of revolutions of an engine output shaft. In order to intermittently transmit a rotational force of an engine output shaft to a gear box input shaft, the internal gear of the planetary gear drive is changed in its state between a rotatable state, a slip state and a fixed state in accordance with the number of revolutions of the engine output shaft. The planetary gear drive comprises a sun gear mounted on the engine output shaft to be rotated at the same time of rotation of the engine output shaft, a plurality of planetary gears gearing with the sun gear and rotatably mounted on a planetary gear carrier, an internal gear gearing with the plurality of planetary gears and selectively changed in its state, and the planetary gear carrier tightly connected to the input shaft such that it rotates the input shaft when it is rotated by the rotational force of the engine output shaft. In order to change the state of the internal gear between the three states, a hydraulic compressing circuit is provided for the power transmission device and cooperates with the engine output shaft.

15 Claims, 12 Drawing Sheets

METHOD OF AND DEVICE FOR POWER TRANSMISSION

BACKGROUND OF THE INVENTION

1. Field of the Invention

The present invention relates in general to a power transmission system of a vehicle, and more particularly to a power transmission method and a power transmission device for intermittently transmit the rotational force of an engine output shaft to an input shaft of a transmission gear box.

2. Description of the Prior Art

A conventional vehicle, such as an automobile driven by the rotational force of an internal combustion engine or a hydraulic-powered machine driven by the hydraulic pump delivery generated by the rotational force of a drive motor, is necessarily provided with a power transmission device, such as a clutch device, in order to intermittently transmit the rotational force of the output shaft of the engine or of the motor to an input shaft of a transmission gear box of the vehicle while controlling the rotational speed of the shaft.

There have been proposed a variety of clutch devices which are generally classified in accordance with their manipulation patterns and their constructions. As known to those skilled in the art, the known clutch devices except for the automatic clutches are manually controlled.

In order to achieve such a manual control for the manual clutch device, the clutch device should be often handled to intermit the power transmission as occasion demands irrespective of the number of revolutions of the engine output shaft. In this regard, the known manual clutch device has a disadvantage in that every handling for the clutch device causes the engine to be imparted with an undesirable starting load.

On the other hand, the known automatic clutch devices achieve the clutching operation using a torque converter which is a kind of power transmission device of the indirect type using the hydraulic clutching power, thus causing a disadvantage in that a large amount of fuel should be required to achieve the clutching operation.

SUMMARY OF THE INVENTION

It is, therefore, an object of the present invention to provide a method of and device for power transmission in which the aforementioned disadvantages can be overcome and which delivers a circulating fluid under pressure in accordance with the number of revolutions of the engine output shaft to control the power transmission in proportion to the number of revolutions of the engine output shaft, and causes a stable power transmission by slowly starting the clutching operation thanking for the difference of the number of revolutions between the engine output shaft and the gear box input shaft, and automatically operates a clutch, such as installed in an automobile.

To accomplish the above object, the present invention causes a fluid under pressure to be delivered from a hydraulic pump in accordance with the number of revolutions of the engine output shaft and to be directly continuously circulated to be practically used, differently from the prior art wherein the pressurized fluid is intermittently charged in a fluid chamber or in a fluid tank prior to its practical use. The fluid under pressure delivered from the hydraulic pump is continuously circulated, thus being referred to a circulating fluid under pressure which is characterized in that its pressure is not constant but proportionally varied in accordance with the number of revolutions of the engine output shaft.

In accordance with an embodiment of the present invention, the aforementioned circulating fluid under pressure is used in a power transmission device which intermittently transmits a rotational force of an engine output shaft to an input shaft of a transmission gear box by employing a planetary gear drive, comprising a sun gear fixed to an engine output shaft, a planetary gear carrier fixed to an input shaft of a manual or automatic clutch, and an internal gear gearing with the planetary gears and controlled in its state between a rotatable state, a slip state and a fixed state in accordance with the number of revolutions of the engine output shaft, whereby the rotational force of the engine output shaft is transmitted to the input shaft of the gear box through the planetary gear drive.

In intermission of the power transmission so as to change the traveling speed during the traveling of the vehicle, the state changing of the internal gear is proportionally controlled in accordance with difference of the number of revolutions between the engine output shaft and the gear box input shaft.

In a power transmission method of the present invention, a rotational force of an engine output shaft is intermittently transmitted to an input shaft of a transmission gear box by employing a planetary gear drive, of which a sun gear is fixed to the engine output shaft and a planetary gear carrier is fixed to the input shaft, the power transmission method comprises the step of changing the state of an internal gear of the planetary gear drive between a rotatable state, a slip state and a fixed state by the circulating fluid under pressure proportionally delivered in accordance with the number of revolutions of the engine output shaft, whereby the rotational force of the engine output shaft is transmitted to the input shaft of the gear box through the planetary gear drive, In the above power transmission method, the state changing of the internal gear is also control led by the circulating fluid under pressure, proportionally delivered in accordance with the number of gear box input shaft, as well as difference of the number of revolutions between the engine output shaft and the gear box input shaft so as to change the traveling speed during the traveling of the vehicle.

In accordance with an embodiment of the present invention, the engine output shaft and the gear box input shaft may be connected to other elements of the planetary gear drive instead of the sun gear and the planetary gear carrier, respectively, without affecting the functioning of the this invention.

In addition, the internal gear is controlled in its state change by a circulating fluid under pressure outputted from a first hydraulic pump in proportion to the number of revolutions of the engine output shaft, thereby causing the controlled rotational force of the engine output shaft to be transmitted to the gear box input shaft through the planetary gear drive.

In the case of speed change during the traveling of the vehicle, the internal gear is controlled in its state change by a pressure difference between a circulating fluid under pressure outputted from the first hydraulic pump in proportion to the number of revolutions of the engine output shaft and a circulating fluid under pressure outputted from a second hydraulic pump in proportion to the number of revolutions of the input shaft.

The circulating fluid under pressure is supplied to a conventional manual clutch such that the manual clutch is automatically controlled by the circulating fluid under pressure and automated.

In an embodiment of the present invention, the internal gear is controlled by a compressing force generated by a plurality of hinged compressing wings in proportion to the number of revolutions of the engine output shaft, the compressing wings being hinged to the engine output shaft such that they are centrifugally spread out in accordance with the rotation of the engine output shaft so as to intend to stand erect on the engine output shaft to compress the internal gear.

Here, the compressing wings are biased by individual compression coil springs which are connected between the wings and the engine output shaft, respectively, and of which spring force should be determined in consideration of the number of revolutions of the engine output shaft.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
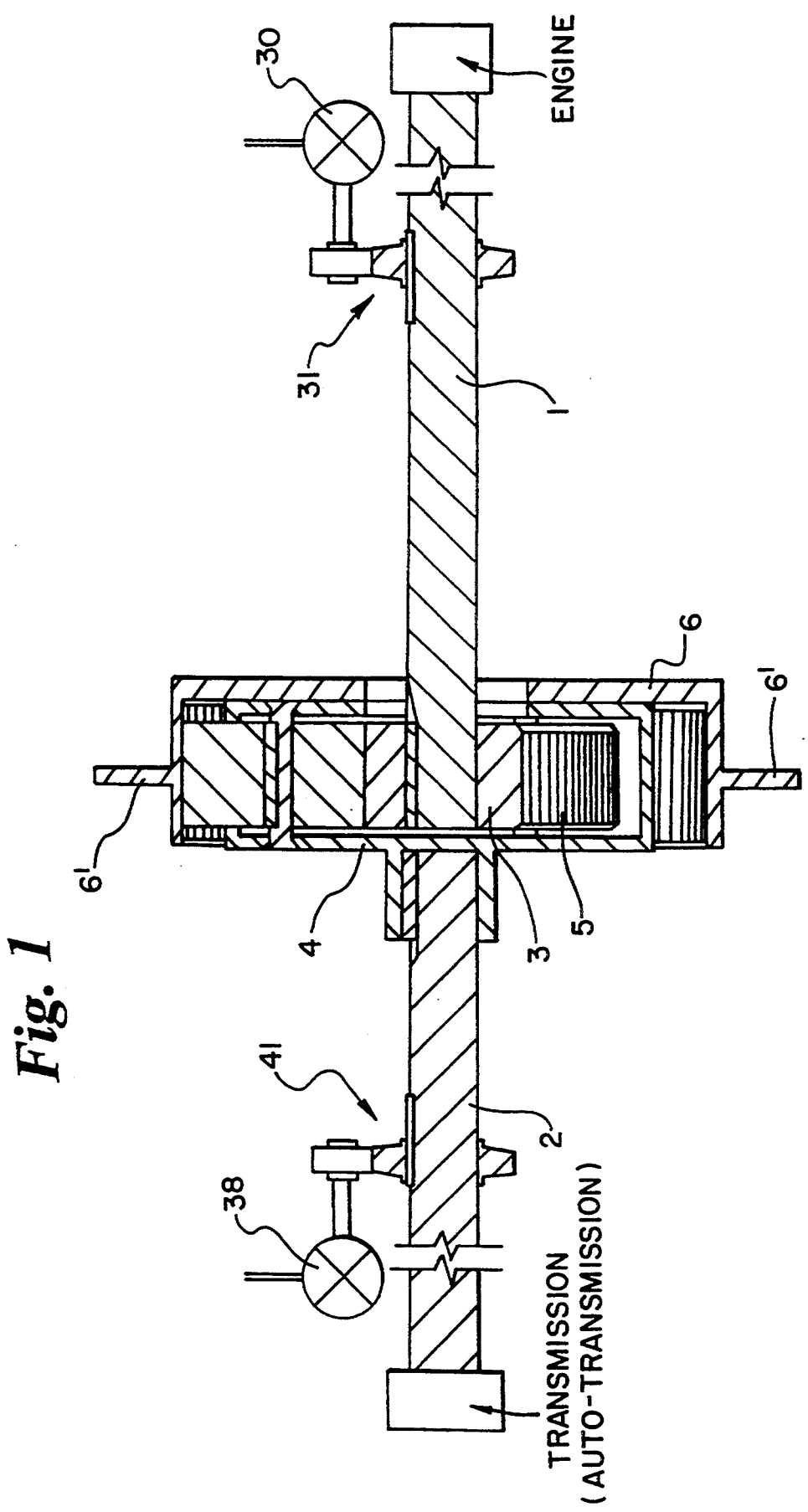
FIGS. 1 and 2 are sectional views showing a power transmission device using a circulating fluid under pressure in power transmission in accordance with a primary embodiment of the present invention.
Figure 2:
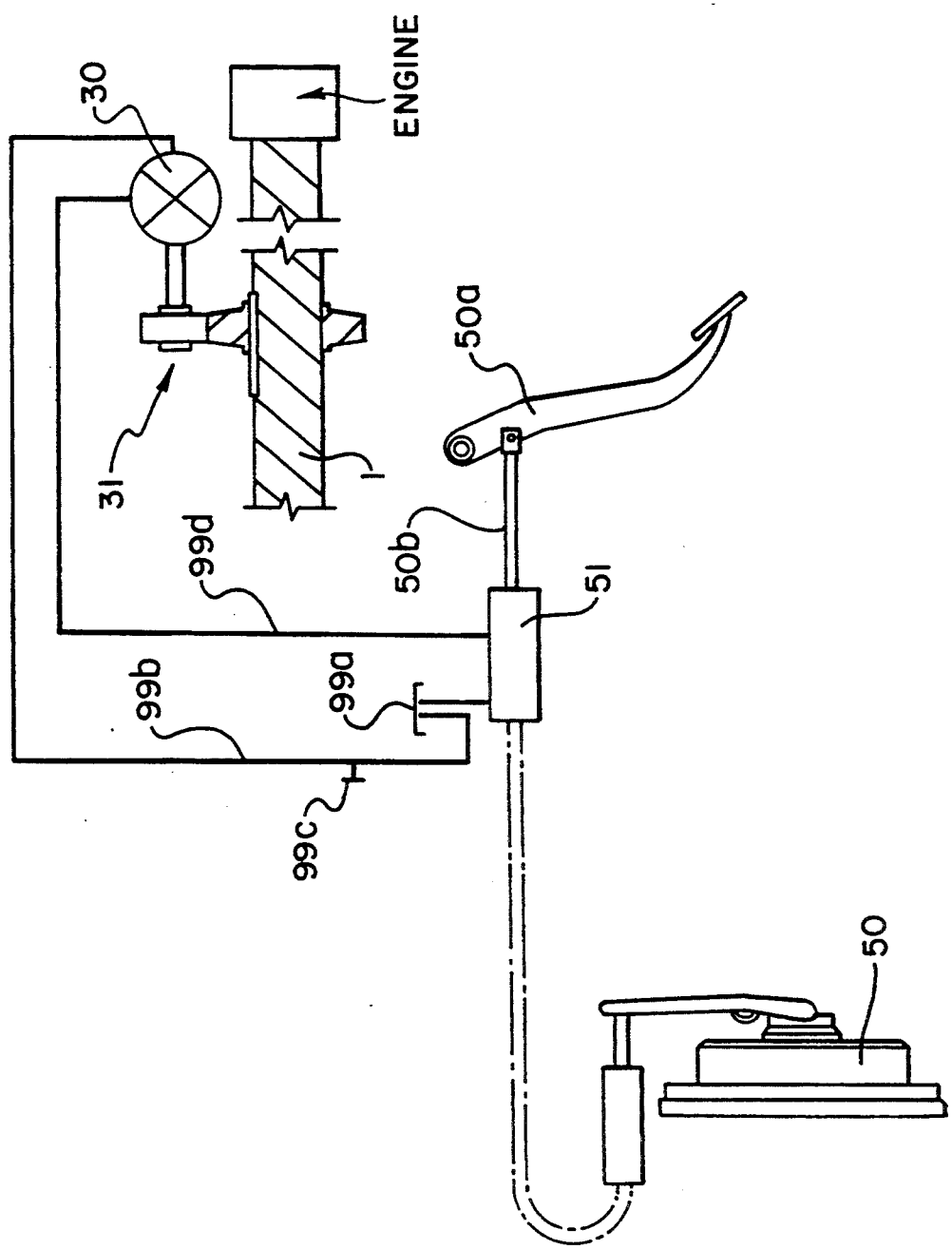

With reference to FIGS. 1 and 2, there is shown a power transmission device employing a planetary gear drive in accordance with a primary embodiment of the present invention. The power transmission device comprises a drive output shaft 1 of an engine and a gear box input shaft 2 which intermittently transmit the rotational force of the engine output shaft 1 to a transmission gear box, such as an automatic gear box or a manual gear box.

The engine output shaft 1 is provided with a first gear mechanism 31 which drives a first hydraulic pump 30 such that this pump 30 delivers a circulating fluid under pressure. The output shaft 1 is also provided at its free end with a sun gear 3 which in turn gears with a plurality of planetary gears 5 rotatably supported by a planetary gear carrier 4 fixed to the gear box input shaft 2. The plurality of planetary gears 5 in turn gear with an internal gear 6 which is provided with a radial flange 6' radially outwardly extending from the outer surface of the internal gear 6. The sun gear 3, the planetary gears 5, the internal gear 6 and the planetary gear carrier constitute the planetary gear drive for intermittently transmitting the rotational force of the engine output shaft 1 to the gear box input shaft 2.

Thus, the radial flange 6' of the internal gear 6 is compressed by compressing means to a fixed state or to a slip state, as will be described herein later. The compressing level of the compressing means is controlled by the circulating fluid under pressure delivered from the first hydraulic pump 30 in accordance with the number of revolutions of the engine output shaft 1. When the radial flange 6' is tightly compressed to the fixed skate, a rotational force equal to the number of revolutions of the output shaft 1 is transmitted to the planetary gear carrier 4 through the internal gear 6 and in turn transmitted to the gear box input shaft 2.

However, when the radial flange 6' is compressed to the slip state, a rotational force less than the number of revolutions of the output shaft 1 is transmitted to the planetary gear carrier 4 through the planetary gears 5 and the internal gear 6. Thus, the rotational force of the output shaft 1 is transmitted to the input shaft 2 of the transmission gear box while being controlled in accordance with the number of revolutions of the output shaft 1.

In order to change the traveling speed of the vehicle during the traveling, the clutching operation is slowly carried out by slowly compressing or releasing the radial flange 6' of the internal gear 6. Here, the slow compression or release of the flange 6' is carried out due to the pressure difference between the circulating fluid under pressure delivered in accordance with the number of revolutions of the engine output shaft 1 and the circulating fluid under pressure delivered in accordance with the number of revolutions of the gear box input shaft 2. Hence, the desired smooth traveling state of the vehicle during the speed change operation is achieved.

Figure 3:
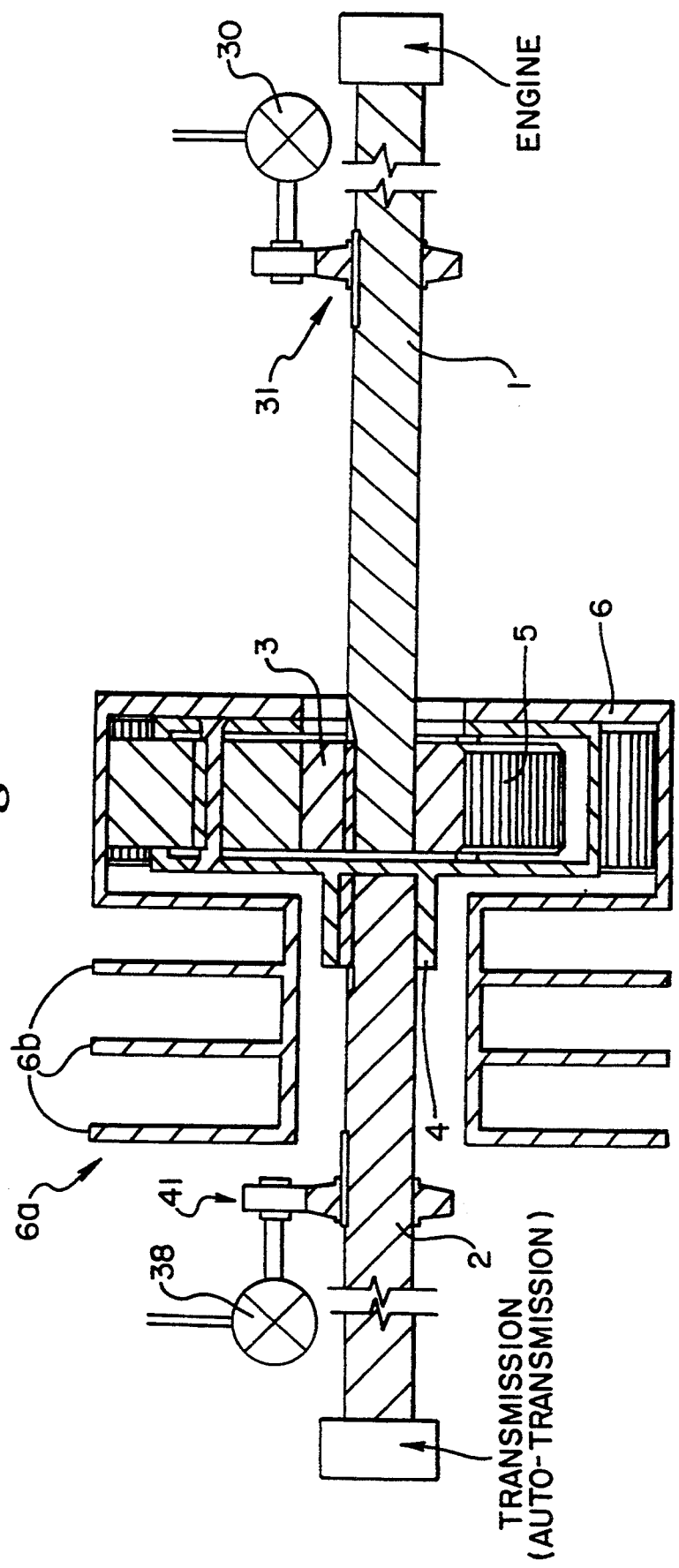
FIG. 3 is a sectional view of a power transmission device having a planetary gear drive provided with a plurality of radial flanges in accordance with a second embodiment of the present invention.

When the engine is a high load engine, it is preferred to provide the internal gear 6 with a plurality of spaced radial flanges 6b instead of the radial flange 6'. The spaced radial flanges 6b radially outwardly extend from an axial cylinder 6a which extends from the internal gear 6 as shown in FIG. 3.

As shown in FIG. 2, the power transmission device of this invention automates a conventional clutch 50 by supplying the circulating fluid under pressure of the first hydraulic pump 30 to a hydraulic cylinder 51 of the clutch 50. That is, the rotation of the engine output shaft 1 causes the first gear mechanism 31 to be operated to make the pump 30 deliver the circulating fluid under pressure. This circulating fluid is supplied to the hydraulic cylinder 51 connected between a clutch pedal 50a and the clutch 50 through a clutch operating link or wire 50b.

When the circulating fluid is supplied to the hydraulic cylinder 51, the cylinder 51 operates the clutch operating link or wire 50b and in turn operates the clutch 50. Thus, the automation of the conventional clutch 50 is achieved in accordance with this invention.

In the drawings, the reference numerals 99b, 99c, 99a and 99d denote a drain passage, a control valve, a drain tank and a hydraulic supply passage, respectively.

Figure 4:
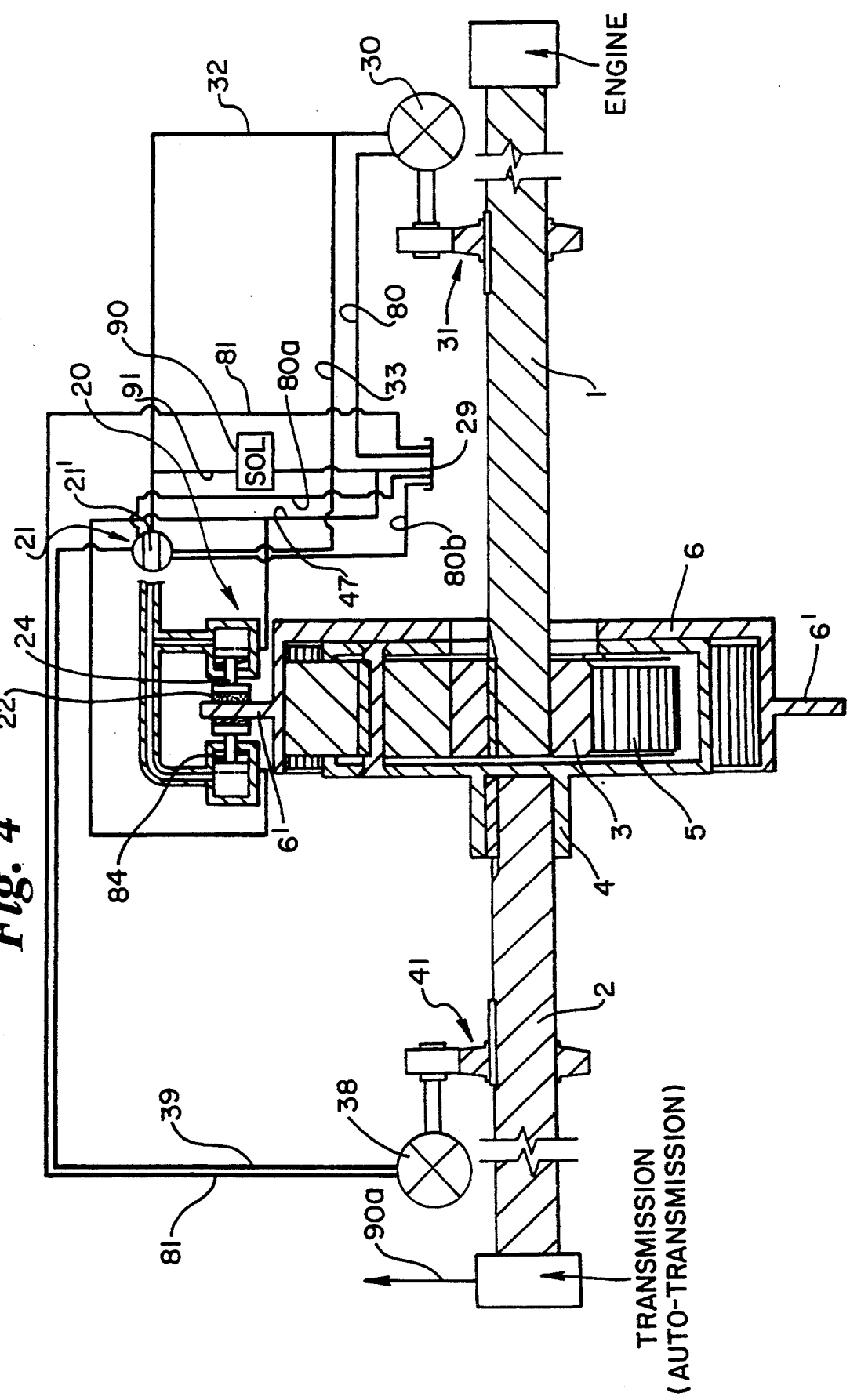
FIG. 4 is a sectional view of the power transmission device of FIG. 1 combined with a flange compressing hydraulic circuit cooperating with an engine output shaft.

Turning to FIG. 4, there is shown the power transmission device of FIG. 1 combined with a flange compressing hydraulic circuit cooperating with the output shaft 1.

As described above, the engine output shaft 1 is provided at its free end with the sun gear 3 which in turn gears with the plurality of planetary gears 5 rotatably supported by the planetary gear carrier 4 of the gear box input shaft 2. The plurality of planetary gears 5 in turn gear with the internal gear 6 having the radial flange 6'. The output shaft 1 is also provided with the first gear mechanism 31 which is rotated at the same time of the rotation of engine output shaft 1. A driven gear of the first gear mechanism 31 is connected to the first hydraulic pump 30, so that the rotational force of the output shaft 1 is transmitted to the pump 30 through the gear mechanism 31 and causes the pump 30 to output the pump delivery or the fluid under pressure. In order to compress the radial flange 6' of the internal gear 6, a pair of hydraulic cylinders 20 are arranged at the opposite sides of the flange 6' such that the compressing pads 22 connected to piston rods of the cylinders 20 come into selective contact with the opposite side surfaces of the flange 6'. The pair of hydraulic cylinders 20 are connected to the hydraulic pump 30 through a main hydraulic passage 32. The main hydraulic passages 32 is connected to the hydraulic cylinders 20 through a flow control valve 21 so as to control the fluid flow to be supplied to the cylinders 20. In addition, a branch hydraulic passage 33 is connected between the first pump 30 and the flow control valve 21 so as to control the flow of the circulating fluid under pressure passing through the valve 21.

On the other hand, the gear box input shaft 2 is provided with a second gear mechanism 41 which is rotated at the same time of the rotation of the gear box input shaft 2. A driven gear of the second gear mechanism 41 is connected to a second hydraulic pump 38, so that the rotational force of the gear box input shaft 2 is transmitted to the pump 38 through the second gear mechanism 38 and causes the pump 38 to output a circulating fluid under pressure. The second pump 38 is in turn connected to the flow control valve 21 through a hydraulic passage 39 so as to apply its pump delivery to the valve 21.

When the hydraulic cylinders 20 are applied with the circulating fluid under pressure outputted from the pumps 30 and 38, the piston rods 24 and 24' of the cylinders 21 are oppositely moved toward the radial flange 6 in accordance with the pressure of the circulating fluid, so that the compressing pads 22 of the piston rods 24 and 24' compress the opposite side surfaces of the radial flange 6', respectively.

The two hydraulic cylinders 20 are connected to a drain tank 29 through individual drain passages 47, thereby draining the circulating fluids under pressure of the cylinders 20 to the drain tank 29. In the hydraulic passage 21' of the flow control valve 21, the circulating fluid under pressure is controlled in its flow in accordance with the pressure difference between the two circulating fluids outputted from individual hydraulic pumps 30 and 38.

In FIG. 3, the reference numerals 80 and 81 denote fluid recovering passages which are connected between the drain tank 9 and the hydraulic pumps 30 and 38, respectively. The reference numerals 80a and 80b denote drain passages, respectively. The reference numeral 90 denotes a solenoid valve which is adapted to control a drain passage 91 connected between the main hydraulic passage 32 and the drain tank 29. The reference numeral 84 denotes a compression coil spring for biasing the piston of the hydraulic cylinder 20 so as to back the piston.

In operation, upon turning on the engine, the output power of the engine is generated in the form of the rotational force of the output shaft 1. At the time of the rotation of the output shaft 1, the sun gear 3 fixed to the free end of the output shaft 1 is rotated. Here, the sun gear 3 gears with the plurality of planetary gear 5 which in turn gear with the internal gear 6 as described above. In this regard, if the internal gear 6 is not fixed, the rotational force of the sun gear 3 is simply transmitted to the internal gear 6 through the plurality of planetary gears 5. Otherwise stated, when the internal gear 6 is not fixed, the plurality of planetary gears 5 only rotate while being placed in their positions between the sun gear 3 and the internal gear 6, so that the rotational force of the sun gear 3 is not transmitted to the gear box input shaft 2 through the planetary gear carrier 4 but simply transmitted to the internal gear 6 so as to cause rotation of the internal gear 6.

However, in accordance with the present invention, the rotation of the output shaft 1 also causes the first gear mechanism 31 to be rotated at the same time and in turn causes the first hydraulic pump 30 to output the circulating fluid under pressure. Here, the pump delivery of the first hydraulic pump 30 is proportional to the number of revolutions of the output shaft 1.

The circulating fluid under pressure of the first pump 30 is applied to the flow control valve 21 through the main hydraulic passage 32 and in turn applied to the two hydraulic cylinders 20 under the flow control of the flow control valve 21. When the circulating fluid under pressure is applied to the two cylinders 20, the pistons of the cylinders 20 are oppositely biased toward the radial flange 6' of the internal gear 6, thereby causing the compressing pads 22 of the cylinders 20 to compress the opposite side surfaces of the radial flange 6', respectively.

In this case, the compressing level of the compressing pads 22 is determined in accordance with the pressure of the circulating fluid applied from the first pump 30 to the hydraulic cylinders 20. Otherwise stated, when the pressure of the circulating fluid applied to the cylinders 20 is relatively lower, the compressing pads 22 can not tightly compress the radial flange 6' such that the internal gear 6 integrally formed with the flange 6' is somewhat rotated. This state is named as the aforementioned "slip state" of the internal gear 6. However, when the pressure of the circulating fluid is relatively higher, the radial flange 6' is tightly compressed by the compressing pads 22 such that the internal gear 6 is tightly fixed. This state is named as the aforementioned "fixed state" of the internal gear 6.

That is, the slip or fixed state of the internal gear 6 is determined in accordance with the flow of the circulating fluid of the first pump 30 which is applied to the hydraulic cylinders 20. The flow of the circulating fluid under pressure is also proportional to the number of revolutions of the engine output shaft 1.

At the initial state of the rotation of the output shaft 1, the flow of the circulating fluid under pressure applied from the first pump 30 to the cylinders 20 is relatively less, so that the slip state of the internal gear 6 is achieved. At this slip state of the internal gear 6, the rotation of the sun gear 3 causes the plurality of planetary gears 5 to rotate and revolve round the sun gear 3 while causing the internal gear 6 to be somewhat rotated under pressure. Hence, the planetary gear carrier 4 is slowly rotated and causes the gear box input shaft 2 to be rotated at a rotational speed lower than that of the output shaft 1. Otherwise stated, the number of revolutions of the gear box input shaft 2 is remarkably lower than that of the output shaft 1. This state is equal to the conventional half clutching state.

From this slip state of the internal gear 6, the number of revolutions of the engine output shaft 1 is increased such that the pressure of the circulating fluid of the first hydraulic pump 30 is increased and makes the compressing pads 22 of the hydraulic cylinders 20 tightly compress the side surfaces of the radial flange 6' of the internal gear 6. Thus, the fixed state of the internal gear 6 is achieved.

At this fixed state of the internal gear 6, the rotation of the sun gear 3 causes the plurality of planetary gears 5 to rotate and revolve round the sun gear 3. The planetary gear carrier 4 combined with the planetary gears 5 is thus rotated and causes the rotation of the gear box input shaft 2. The rotational force of the gear box input shaft 2 is in turn transmitted to a propeller shaft 90a of the vehicle.

In order to change the traveling speed of the vehicle during the above fixed state of the internal gear 6 or during the travelling state of the vehicle, it is required to intermit the transmission of the rotational force of the engine output shaft 1 to the gear box input shaft 2 as follows.

That is, the solenoid valve 90 opens the drain passage 91 between the main hydraulic passage 32 and the drain tank 29. The circulating fluid under pressure outputted from the first pump 30 is thus not applied to the hydraulic cylinders 20 through the main passage 32 but simply drained to the drain tank 29 through the drain passage 91.

As a result, the restoring force of the compression coil spring 84 in the piston rod chamber of each of the hydraulic cylinders 20 overcomes the hydraulic pressure imparted to the other chamber of the cylinder 20. This causes the remaining fluid in the other chamber of the cylinder 20 is drained to the drain tank 29 through the drain passage 47, thereby making the compressing pad 22 be spaced from the side surface of the radial flange 6' of the internal gear 6. Thus, the planetary gears 5 can not revolve but simply rotate between the rotating sun gear 3 and the rotating internal gear 6 as described above, thereby intermitting the power transmission between the output shaft 1 and the gear box input shaft 2.

In this case, the drainage of the circulating fluid from the hydraulic cylinders 20 is carried out to change the traveling speed of the vehicle, so that the speed change operation is stably achieved.

Here, both the number of revolutions of the engine output shaft 1 and the number of revolutions of the gear box input shaft 2 in the case of intermission of the power transmission are different in accordance with the traveling condition of the vehicle, such as when traveling on an uphill road or on a downhill road.

Such a difference of the number of revolutions between the output shaft I and the input shaft 2 causes the flow difference between the first pump 30 cooperating with the engine output shaft 1 and the second pump 38 cooperating with the input shaft 2, thus resulting in the pressure difference between the circulating fluids supplied from the hydraulic pumps 30 and 38 to the flow control valve 21.

Such a pressure difference of the circulating fluids under pressure supplied to the flow control valve 21 controls the hydraulic passage 21' of the flow control valve 21 and in turn controls the circulating fluids under pressure drained from individual hydraulic cylinders 20 to the drain tank 29 through the drain passages 47. In this regard, the compressing pads 22 of the cylinders 20 are slowly spaced from individual side surfaces of the radial flange 6' such that the desired stable traveling state of the vehicle is achieved irrespective of the traveling condition of the vehicle.

Figure 5:
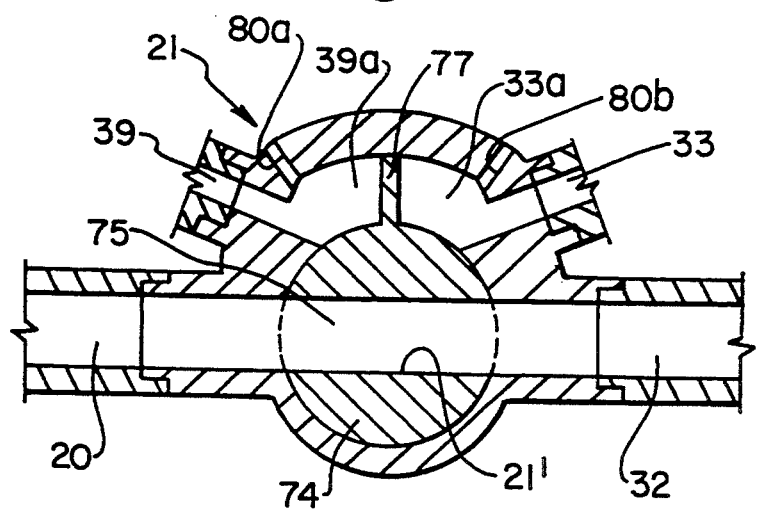
FIGS. 5 to 7 are sectional views of a flow control valve of the flange compressing hydraulic circuit of FIG. 4 and showing various positions of a ball valve with respect to a main hydraulic passage, respectively.

With reference to FIG. 5, there is shown a construction of the flow control valve 21 in accordance with an embodiment of the present invention. Of course, it should be understood that there exist a variety of different configurations of the flow control valve which yield the same result as that will be described for the embodiment of FIG. 5.

As shown in this drawing, the flow control valve 21 is provided with a ball valve 74 which is rotatably encased in the valve body and has a through hole 75 having the same diameter as the inner diameter of the main hydraulic passage 32. The valve body also defines a cavity above the ball valve 74. This ball valve 74 has a blade 77 which divides the cavity inside the valve body into two chambers, that is, a first hydraulic chamber 39a communicating with the hydraulic passage 39 and a second hydraulic chamber 33a communicating with the branch hydraulic passage 33.

Thanking for such a construction of the flow control valve 21, the circulating fluids, outputted from the individual pumps 30 and 38 and showing different pressures due to the difference of the number of revolutions between the output shaft 1 and the input shaft 2, are applied to the first chamber 39a and the second chamber 33a through the hydraulic passages 39 and 32, respectively.

Figure 6:
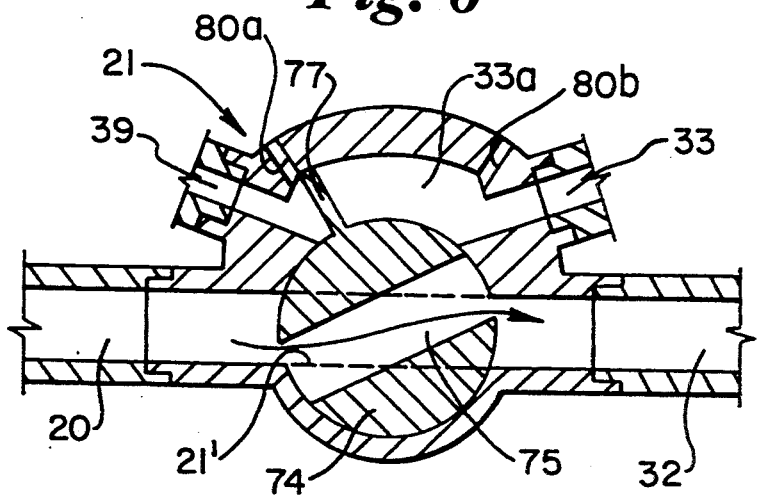
Figure 7:
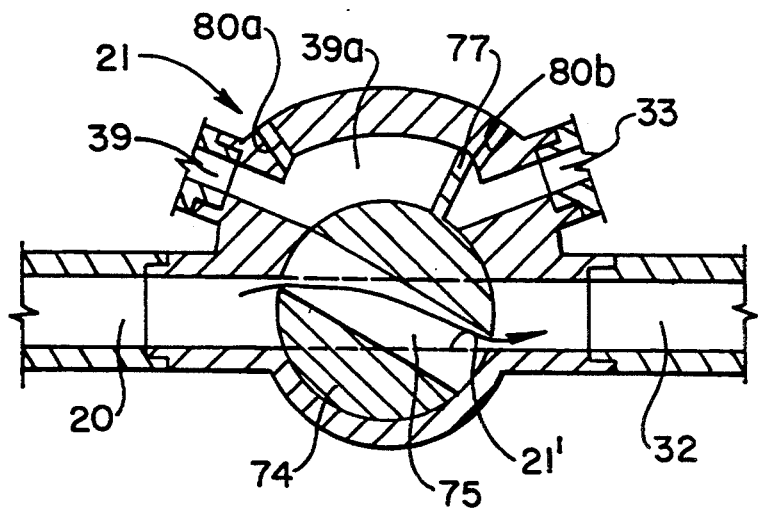

Here, when the pressure of the circulating fluid applied to the second chamber 33a is higher than that of the first chamber 39a, the hydraulic pressure difference between the two chambers 33a and 39a causes the blade 77 of the ball valve 74 to be biased toward the first chamber 39a as shown in FIG. 6. On the contrary, when the pressure of the circulating fluid applied to the first chamber 39a is higher than that of the second chamber 33a, the blade 77 of the ball valve 74 to be biased toward the second chamber 33a as shown in FIG. 7.

When the blade 77 of the ball valve 74 is biased to either direction due to the pressure difference as described above, the area of the hydraulic passage 21' of the ball valve 74 communicating with the main hydraulic passage 32 is slowly reduced, thereby causing the fluid flow applied to the hydraulic cylinders 20 to be slowly reduced.

Such a flow control makes the drainage of the circulating fluid from the cylinders 20 to the drain tank 29 be slowly carried out, thus preventing a rapid separation of the compressing pads 22 from the radial flange 6'. Thus, the traveling speed of the vehicle is stably smoothly changed. Of course, even though there is a remarkable difference of the number of revolutions between the output shaft 1 and the input shaft 2 during the traveling speed change operation, the hydraulic passage 21' should not be completely closed.

When the aforementioned slow separation of the compressing pads 22 is continued for a time, the compressing pads 22 are completely spaced apart from the radial flange 6' such that the idle running state of the engine output shaft 1 is achieved, otherwise stated, the rotational force of the engine output shaft 1 is not further transmitted to the gear box input shaft 2.

At this idle running state, the transmission gear box is operated so as to achieve the desired traveling speed change prior to turning off the solenoid valve 90. When the solenoid valve 90 is turned off, the drain passage 91 is closed and this causes the circulating fluid under pressure of the first hydraulic pump 30 to be applied to hydraulic cylinders 20 through the main hydraulic passage 32, As a result, the fixed state of the internal gear 6 is achieved and the power transmission from the engine output shaft 1 to the gear box input shaft 2 is recovered.

When the power transmission is recovered as described above, the hydraulic cylinders 20 are slowly applied with the circulating fluid thanking for the difference of the number of revolutions between the output shaft 1 and the input shaft 2 as described above. Hence, the circulating fluid under pressure to be supplied to the cylinders 20 is slowly increased until the hydraulic passage 21' of the flow control valve 21 recovers its fully opened position and this results in the desired stable traveling state of the vehicle during the speed change operation.

Figure 8:
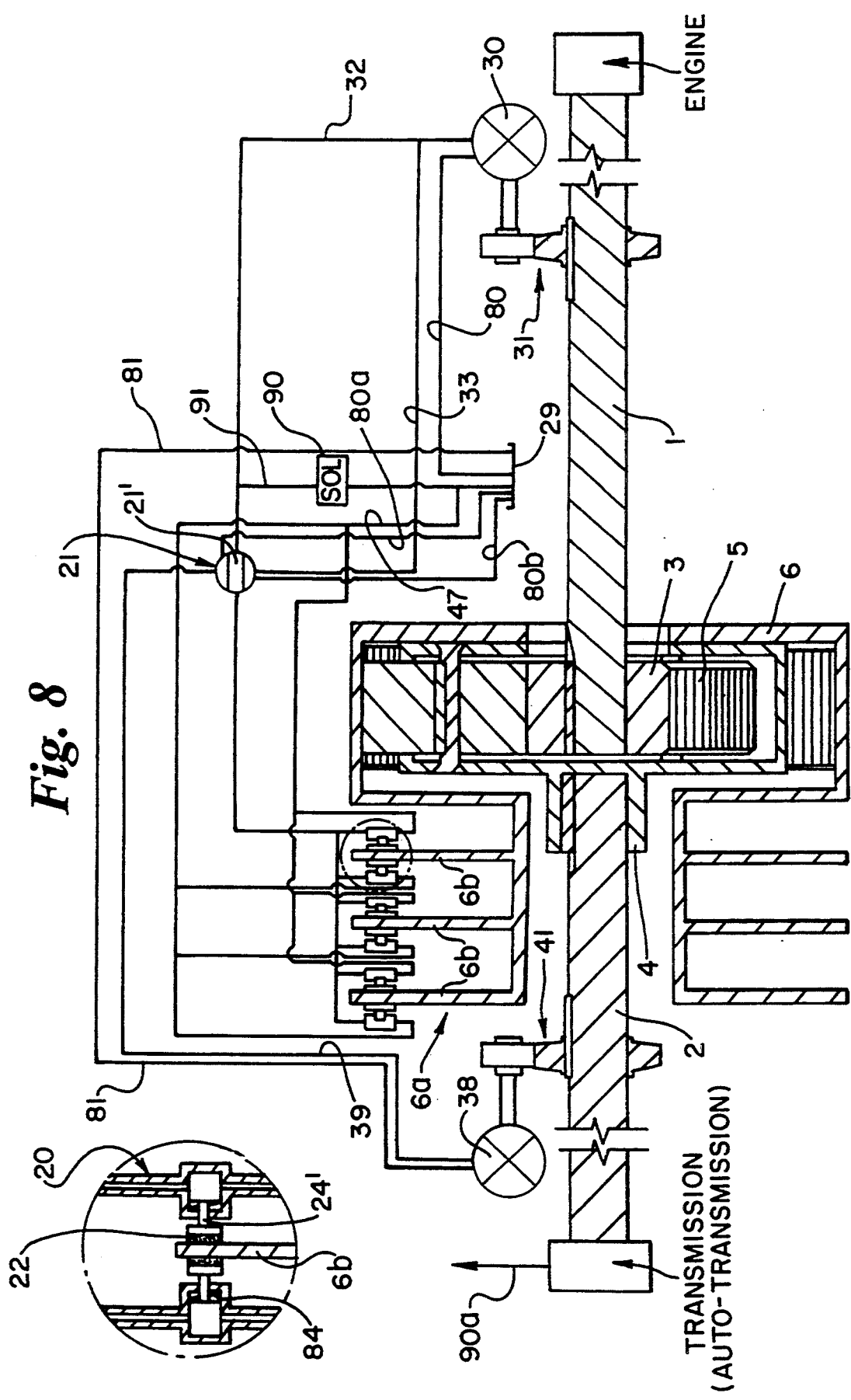
FIG. 8 is a sectional view of the power transmission device of FIG. 3 combined with a flange compressing hydraulic circuit cooperating with the engine output shaft.

The drain passages 80a and 80b continuously circulates the fluids under pressure which are supplied to the first chamber 39a and the second chamber 33a of the flow control valve 21, respectively, Turning to FIG. 8, there is shown the power transmission device of FIG. 3 combined with the flange compressing hydraulic circuit of the present invention. In this second embodiment, in order to fix the internal gear 6, the plurality of spaced radial flanges 6b are radially outwardly extending from the axial cylinder 6a extending from the internal gear 6. A pair of hydraulic cylinders 20 are arranged at opposite sides of each of the radial flanges 6b. All of the hydraulic cylinders 20 are connected to the first hydraulic pump 30 through the main hydraulic passage 32 and applied with the circulating fluid under pressure outputted from the pump 30. When all of the hydraulic cylinders 20 are applied with the circulating fluid under pressure, their compressing pads 22 compress individual flanges 6b and achieve the slip state of the fixed states of the flanges 6b, respectively.

In accordance with the present invention, the power transmission state of the power transmission device is controlled in accordance with the hydraulic fixing force of the circulating fluid under pressure outputted from the first hydraulic pump 30 in proportion to the number of revolutions of the engine output shaft 1. In addition, in order to achieve the desired speed change during the traveling of the vehicle, the state of the internal gear 6 is smoothly controlled by the pressure difference between the circulating fluids outputted from individual hydraulic pumps 30 and 38 in accordance with the different numbers of revolutions of the engine output shaft 1 and of the gear box input shaft 2, thereby achieving the desired smooth traveling of the vehicle during the speed change. The compressing pads 22 of the hydraulic cylinders 20 compress the opposite side surfaces of the radial flange 6' of the internal gear 6 as required. These compressing pads 22 are hinged to the piston rods of the hydraulic cylinders 20, respectively, such that the compressing pads 20 can be easily adjusted in its position with respect to the radial flange 6'. Thus, the compressing pad 22 is easily changed with new one without disassemble of the elements relating to the compressing pad 22.

Figure 9:
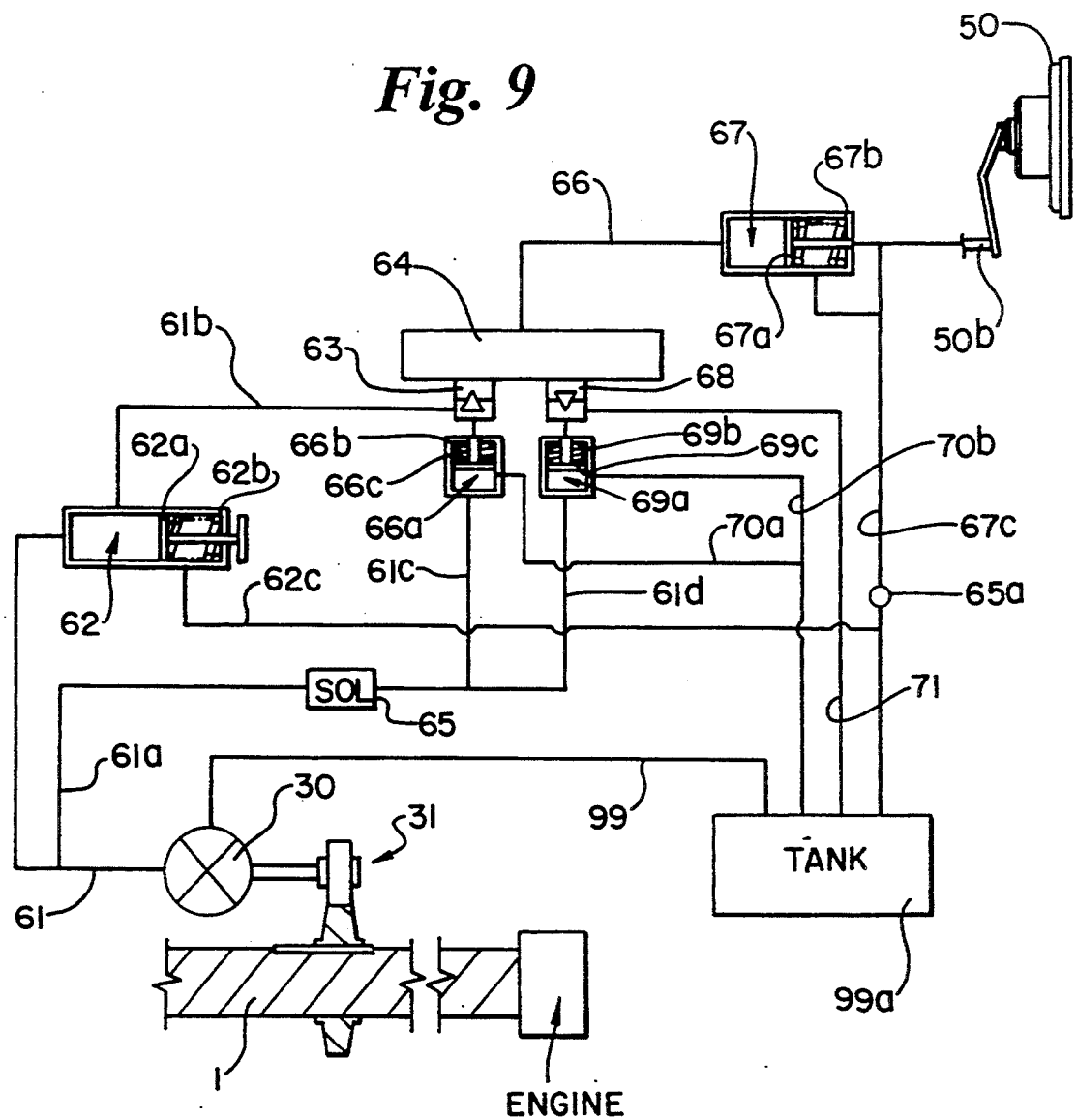
FIG. 9 is a circuit diagram of a detailed hydraulic circuit of the power transmission device of FIG. 2.

FIG. 9 shows a detailed hydraulic circuit of the power transmission device of FIG. 2.

Upon turning on the engine, the output power of the engine is generated in the form of the rotational force of the output shaft 1. The rotation of the output shaft 1 causes the first gear mechanism 31 to be rotated at the same time and in turn causes the first hydraulic pump 30 to output the circulating fluid under pressure. This circulating fluid or the pump delivery of the first hydraulic pump 30 is supplied to a first flow control valve 62 through a supply passage 61 and in turn supplied to an oil chamber 64 through both a controlled fluid passage 61b and an inlet control valve 63. At this time, the inlet control valve 63 has been opened by a spring force of a spring 66b and allows the circulating fluid to be introduced into the oil chamber 64.

In this case, a solenoid valve 65 has been opened and causes the circulating fluid of the first pump 30 to be supplied to an inlet control cylinder 66a through both a pair of passages 61a and 61c.

When the circulating fluid is charged in the cylinder 66a, it biases the piston 66c while compressing the spring 66b and slowly closes the inlet control valve 63. Here, since the spring 66b intends to be compressed when it is applied with a pressure higher than a predetermined level, there is no problem in supplying the circulating fluid under pressure to the oil chamber 64 through the inlet control valve 63 which is slowly closed. When the inlet control valve 63 is completely closed, the circulating fluid under pressure is not introduced to the oil chamber 64 but drained from the first flow control valve 62 to the drain tank 99a through a drain passage 62c to be recovered and recirculated.

The circulating fluid under pressure is in turn supplied from the oil chamber 64 to an actuating cylinder 67 through a passage 66 and biases a piston 67a while compressing a compression coil spring 67b, thereby moving the clutch operating link or wire 50b to operate the clutch 50.

When the inlet control valve 63 is slowly closed since the pressure of the circulating fluid is higher than the predetermined level, the circulating fluid under pressure passing through the passage 61a is applied to a drain control cylinder 69a through a passage 61d. Thus, a piston 69c of the cylinder 69a is slowly biased while compressing a compression coil spring 89b in the same manner as the inlet control cylinder 66a and slowly opens the a drain control valve 68. When the clutching operation of the clutch 50 is accomplished, the circulating fluid under pressure is drained to the drain tank 99a through a drain passage 71 to be recovered and recirculated.

When the pressure of the circulating fluid supplied to the first flow control valve 62 is higher than the predetermined level, the piston 62a of the valve 62 is biased by the circulating fluid while compressing the compression coil spring 62b such that the overflow of the circulating fluid causing the overpressure of the fluid is drained from the flow control valve 62 to the drain tank 99a through the drain passage 67c to be recovered and recirculated. The circulating fluid under pressure supplied to the actuating cylinder 67 is thus controlled in its pressure.

In the drawing, FIG. 9, the reference numerals 70a and 70b denote an inlet-side drain passage and an outlet-side drain passage, respectively, for continuously circulating the circulating fluid under pressure to be supplied to the cylinders 66a and 69a. The reference numerals 99 and 65a denote a hydraulic passage for supplying the circulating fluid from the drain tank 99a to the first hydraulic pump 30, and a check valve for checking the draining fluid under pressure, respectively.

In order to change the traveling speed when accomplishing the clutching operation for the clutch 50, the solenoid valve 65 is closed. At this time, the rotation of the engine output shaft 1 is continued, so that the circulating fluid under pressure is continuously delivered. However, since the solenoid valve 65 is closed, the inlet control valve 63 is biased by the spring force of the spring 66b to be opened.

Thus, the circulating fluid under pressure delivered in accordance with the rotation of the engine output shaft 1 operates the clutch 50.

Otherwise stated, when the solenoid valve 65 is turned on, the inlet control valve 63 is opened while the drain control valve 68 is closed. On the contrary, when the solenoid valve 65 is turned off, the inlet control valve 63 is closed while the draining control valve 68 is opened. Thus, the clutching operation of the clutch 50 as well as the recirculation of the circulating fluid under pressure is achieved irrespective of the on/off state of the solenoid valve 65.

When it is required to operate the clutch 50 to change the traveling speed during the traveling of the vehicle, the solenoid valve 65 is turned on to be closed, so that the circulating fluid under pressure is supplied to the actuating cylinder 67 to achieve the desired clutching operation.

Figure 10:
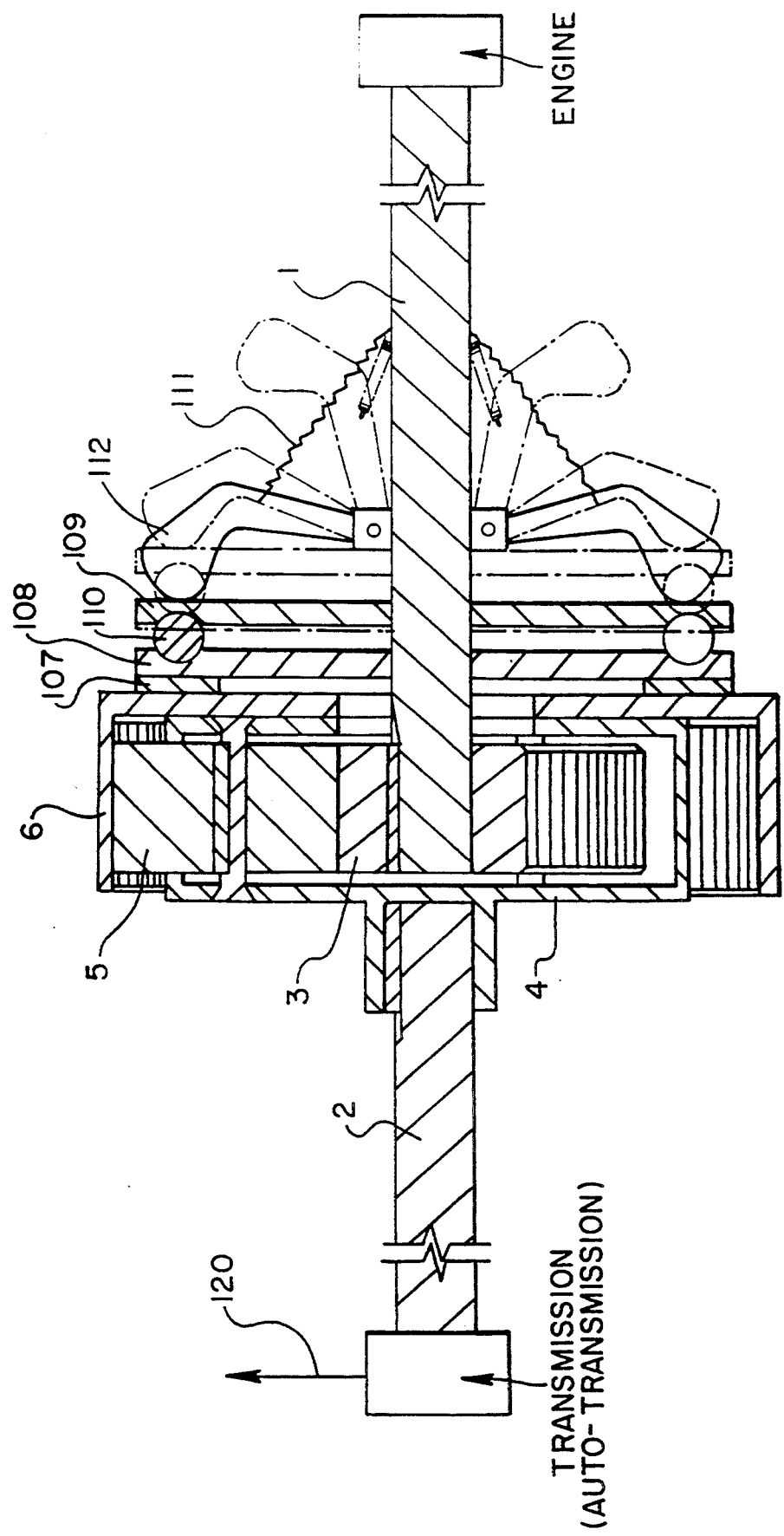
FIGS. 10 and 11 are sectional views of power transmission devices provided with a plurality of hinged compressing wings in accordance with third and fourth embodiments of the present invention, respectively.

With reference to FIG. 10, there is shown a power transmission device in accordance with a third embodiment of the present invention using the centrifugal force generated by the rotation of the engine output shaft 1.

In this third embodiment, the power transmission device comprises the engine output shaft 1 and the gear box input shaft 2 which intermittently transmit the rotational force of the output shaft 1 to the transmission gear box.

The output shaft 1 is provided at its free end with the sun gear 3 which gears with the plurality of planetary gears 5 rotatably supported by the planetary gear carrier 4 of the gear box input shaft 2. The plurality of planetary gears 5 in turn gear with the internal gear 6 having no radial flange 6'.

The power transmission device further includes a compressing disc 108 which is movably mounted about the engine output shaft 1 such that it is axially reciprocated along the output shaft 1 within a predetermined axial distance. This disc 108 is provided with a plurality of compressing pads 107 on a side thereof facing the internal gear 6. At the other side of the disc 108, a rotatable biasing disc 109 having a plurality of compressing balls 110 is mounted about the engine out shaft 1 such that it is axially reciprocated along the output shaft 1. In order to receive the compressing balls 110 when the rotatable biasing disc 109 is biased to the compressing disc 108 so as to compress the disc 108 as shown at the solid line of FIG. 10, the compressing disc 108 is provided with a semicircular sectional groove on its surface facing the rotatable biasing disc 109.

In addition, a plurality of hinged compressing wings 112 are hinged to the engine output shaft 1 at a position spaced from the rotatable biasing disc 109 by a predetermined distance such that they are centrifugally spread out to compress the rotatable biasing disc 109 toward the disc 108 when the engine output shaft 1 is rotated. Each of the compressing wings 112 is biased by a compressing coil spring 111 which is connected between the upper section of the compressing wing 112 and the engine output shaft 1. The drawing, the reference numeral 120 denote the propeller shaft of the vehicle.

When the engine is stopped, there is no centrifugal force and each of the compressing wings 112 is only biased by the restoring force of the compression coil spring 111, so that all of the compressing wings 112 are placed at their fully narrowed positions, respectively.

Upon turning on the engine at this state, the rotating output shaft 1 generates the centrifugal force, thereby causing the compressing wings 112 to be slowly spread out while overcoming the spring force of the compression coil spring 111. As the rotational speed of the engine output shaft 1 is increased, the centrifugal force is also increased, so that the compressing wings 112 intend to stand erect on the output shaft 1. Thus, the free ends of the compressing wings 112 come into contact with the rotatable biasing disc 109 and bias the disc 109 toward the internal gear 6, thus moving the disc 109 toward the compressing disc 108. As a result, the compressing balls 110 of the disc 109 come into contact with the compressing disc 108 and bias the disc 108 toward the internal gear 6. The compressing pads 107 of the disc 108 thus come into contact with the side surface of the internal gear 6 and compress it, thereby achieving the slip state or the fixed state of the internal gear 6.

Here, the rotatable biasing disc 109 moves while contacting with the free ends of the compressing wings 112 rotating together with the engine output shaft 1. The biasing disc 109 thus rotates along with the engine output shaft 1. However, since the compressing balls 110 are provided on the rotatable biasing disc 109 such that they are rolled on the surface of the disc 109, the compressing balls 110 do not transmit the rotational force of the rotating biasing disc 109 to the compressing disc 108 but transmits the biasing force of the rotating disc 109 to the compressing disc 108. Thus, the compressing disc 108 is not rotated but compresses the internal gear 6 to fix it.

In accordance with the fixed state of the internal gear 6, the rotational force of the engine output shaft 1 is transmitted to the plurality of planetary gears 5 through the rotating sun gear 3, thereby causing the planetary gears 5 to rotate and revolve round the sun gear 3.

Such a revolution of the planetary gears 5 causes the rotation of the planetary gear carrier 4, so that the rotational force of the engine output shaft 1 is transmitted to the gear box input shaft 2. The rotational force of the input shaft 2 is, thereafter, transmitted to the propeller shaft 120 through the transmission gear box and rotates this shaft 120.

In the third embodiment, the centrifugal force generated by the rotation of the engine output shaft 1 is influenced by the number of revolutions of the engine output shaft 1. Thus, at the initial stage of the rotation of the engine output shaft 1 showing the relatively less number of revolutions, each of the compressing wings 112 are slightly spread out and come into contact with no rotatable biasing disc 109 due to the spring force of the compression coil spring 111.

Therefore, the level of centrifugal force capable of causing each of the compressing wings 112 to start its compressing operation is easily controlled by adjusting the spring force of the compression coil springs 111 biasing the wings 112.

The centrifugal force imparted to the compressing wings 112 slowly increases in proportion to the number of revolutions of the engine output shaft 1. Thus, the increasing centrifugal force causes the free ends of the compressing wings 112 to come into contact with the side surface of the rotatable biasing disc 109 and to slowly bias the biasing disc 109 toward the internal gear 6. The biased rotatable disc 109 in turn compresses the compressing disc 108 through its compressing balls 110 rolling on the side surface of the rotating disc 109 between the two discs 108 and 109. When the compressing disc 108 is slowly biased toward the internal gear 6, the compressing pads 107 of the disc 108 slowly compress the side surface of the internal gear 6, thereby achieving the slip state of the internal gear 6 corresponding to the conventional half clutching state. At this slip state of the internal gear 6, the rotation of the sun gear 3 causes the plurality of planetary gears 5 to rotate and revolve together with the somewhat rotating internal gear 6. Hence, the planetary gear carrier 4 is slowly rotated and causes the gear box input shaft 2 to be rotated at a rotational speed lower than that of the engine output shaft 1.

When it is required to maintain the slip state of the internal gear 6, the predetermined number of revolutions of the engine output shaft 1 in accordance with the spring force of the compression coil spring 111 should be maintained.

It should be understood that the hinged compressing wings 112 are constructed such that they can not completely stand erect on the engine output shaft 1 even when the desired fixed state of the internal gear 6 is achieved. Otherwise, the compressing wings 112 will not continue the impartment of their biasing force caused by the centrifugal force to the rotatable biasing disc 109.

In accordance with the present invention, the hinged compressing wings 112 may be hinged to the engine output shaft 1 at the same position as the rotatable biasing disc 109 other than the position spaced apart from the biasing disc 109. In this case, it is required to provide the rotatable biasing disc 109 with a space for the turning motion of the wings 112.

In accordance with the aforementioned third embodiment, the hinged compressing wings 112 achieves the slip state or the fixed state of the internal gear 6 in accordance with the number of revolutions of the engine output shaft 1, thereby remarkably reducing the starting load of the engine.

In the third embodiment of FIG. 10, the compressing discs 108 and 109 are movably separately mounted about the engine output shaft 1 such that they are separately reciprocated along the engine output shaft 1. However, the axial reciprocation of the compressing discs 108 and 109 along the engine output shaft 1 may be achieved by another embodiment, that is, a fourth embodiment, as shown in FIG. 11.

Figure 11:
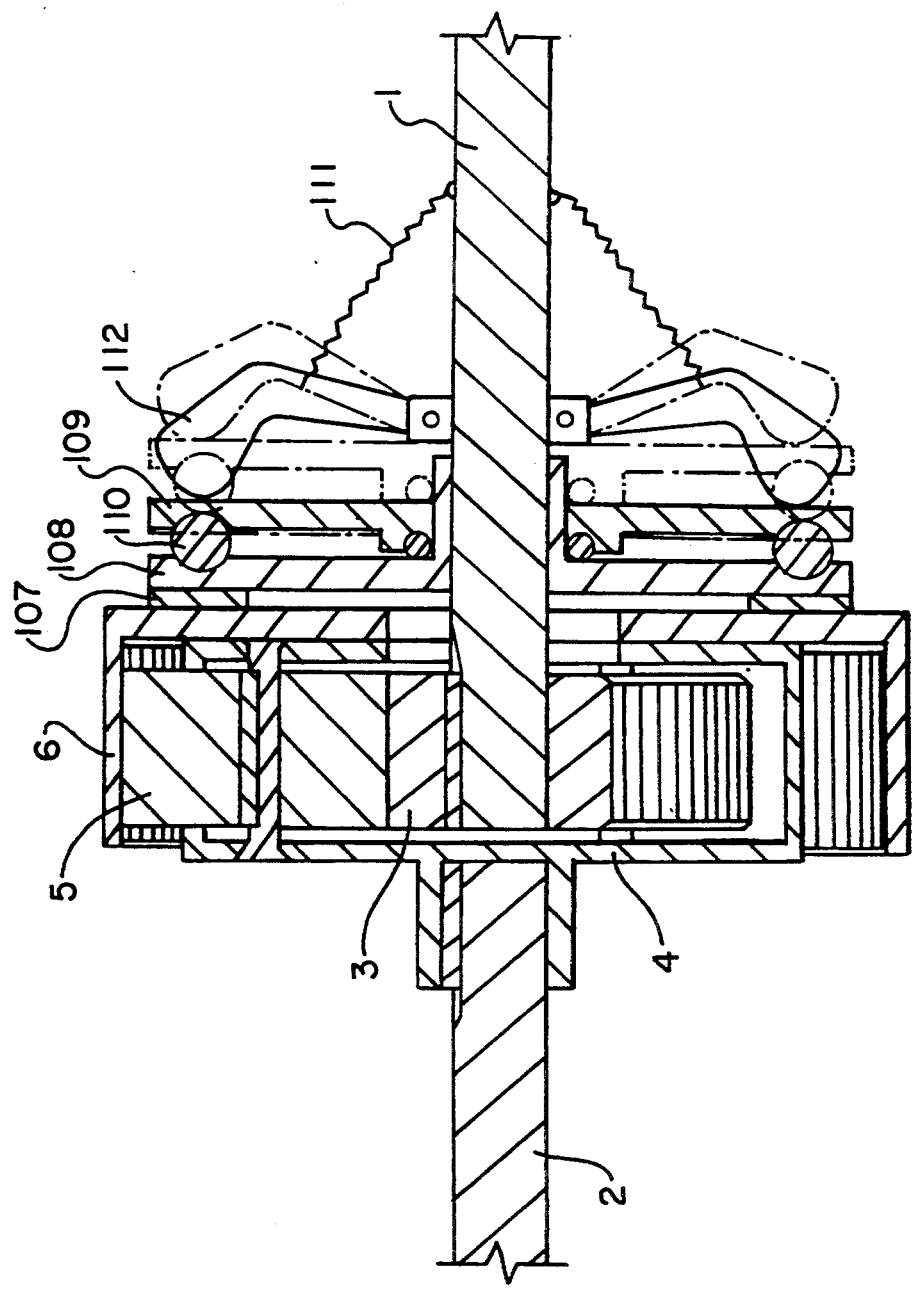

As shown in FIG. 11, the compressing disc 108 is provided with a boss which is mounted about the engine output shaft 1 such that it is axially reciprocated along the engine output shaft 1, and about which the rotatable biasing disc 109 is rotatably mounted. In this case, the rotatable biasing disc 109 is axially reciprocated along the boss of the compressing disc 108 by the biasing force of the hinged compressing wings 112.

Figure 12:
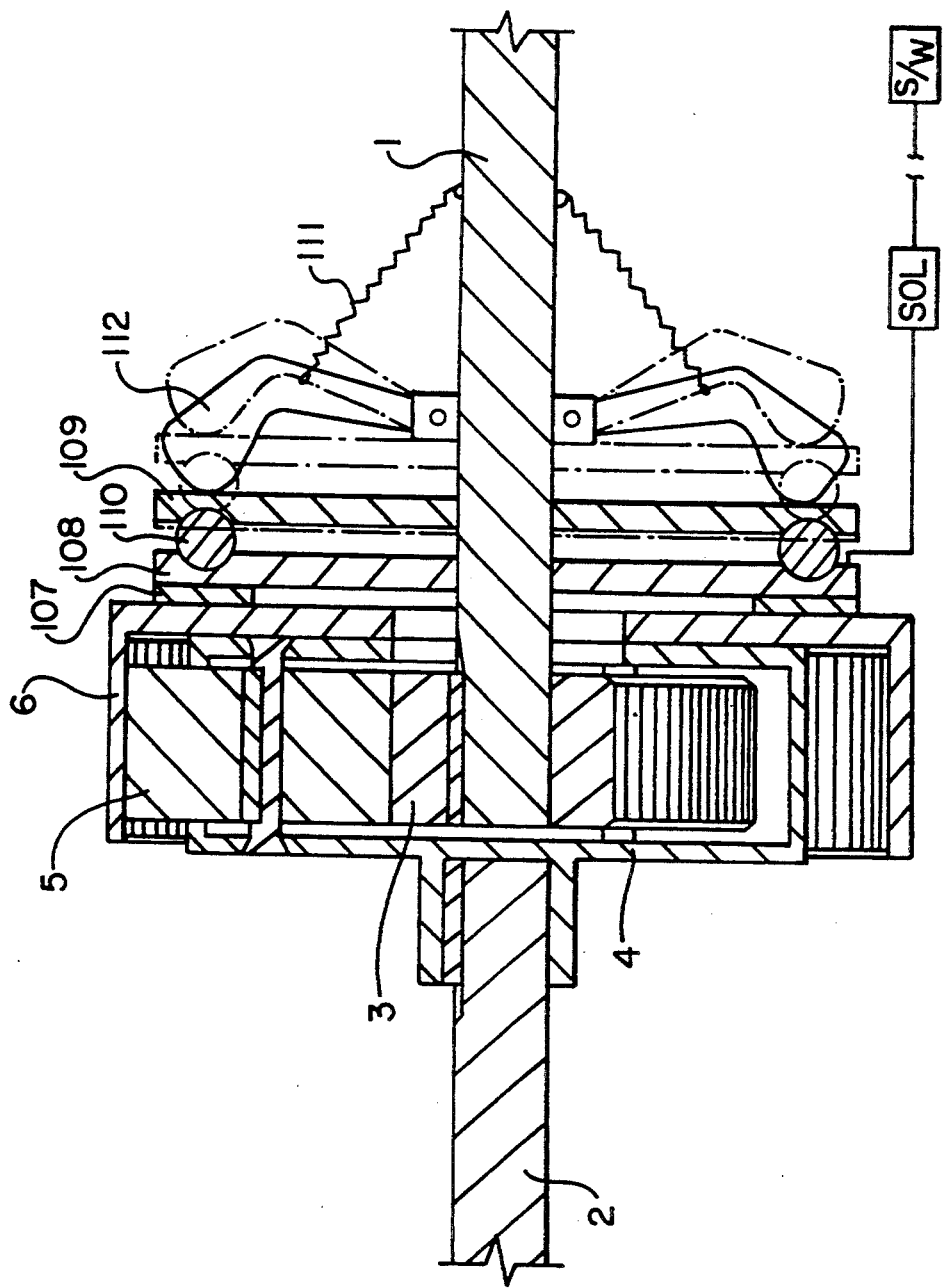
FIG. 12 is a sectional view of the power transmission device of FIG. 10 combined with a solenoid valve and a control switch for separating a compressing disc from an internal gear of the planetary gear drive.

In order to intermit the power transmission of the device according to the third embodiment shown in FIG. 10 such as for changing the traveling speed of the vehicle, a solenoid valve "Sol" is connected to the compressing disc 108 as shown in FIG. 12. The solenoid valve is controlled by a switch "S/W" such that the solenoid valve forcibly separates the compressing disc 108 from the side surface of the internal gear 6 in order to release the internal gear 6.

Figure 13:
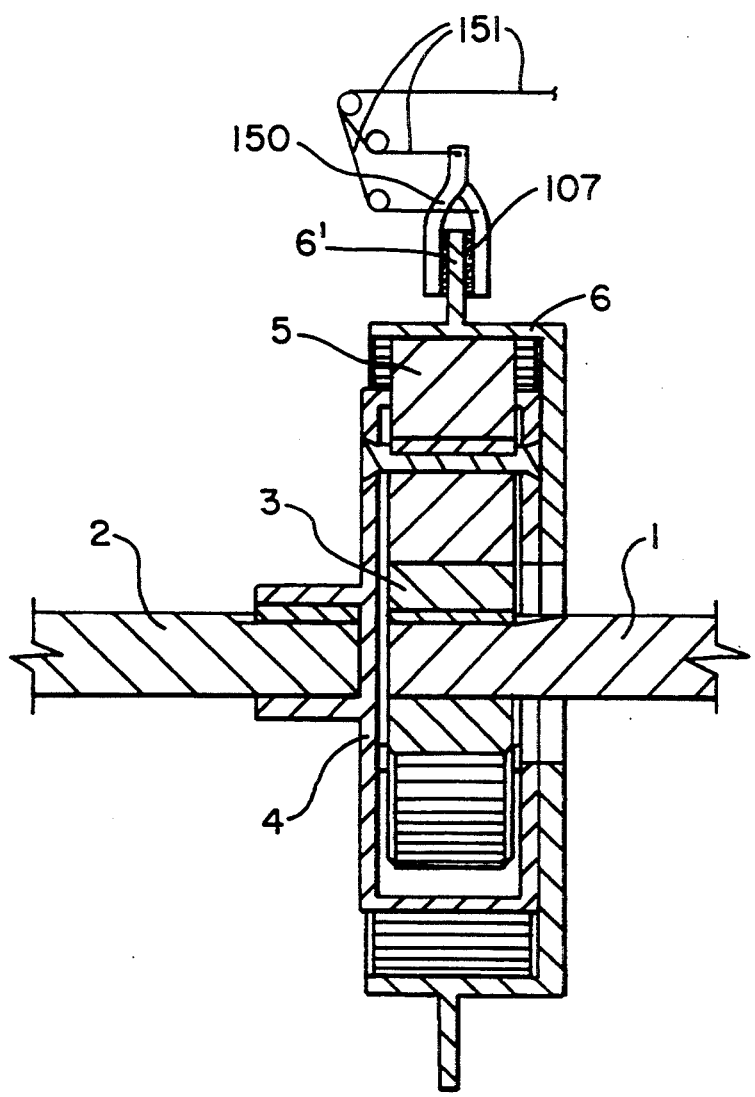
FIG. 13 is a sectional view of a power transmission device having a gripper in accordance with a fifth embodiment of the present invention.

Turning to FIG. 13, there is shown a fifth embodiment of the present invention. In this fifth embodiment, the general shape of the power transmission device remains the same as in the primary embodiment, but the radial flange compressing means is altered. That is, a wire operable gripper 150 having a pair of compressing pads 107 is substituted for the hydraulic cylinders 20 of the primary embodiment. The gripper 150 is controlled in its gripping force by a pair of wires 151 so as to gripe the radial flange 6' of the internal gear 6, thereby achieving the slip state or the fixed state of the internal gear 6. The gripper 150 of this embodiment yields the same result as that described for the primary embodiment without affecting the functioning of this invention.

Figure 14:
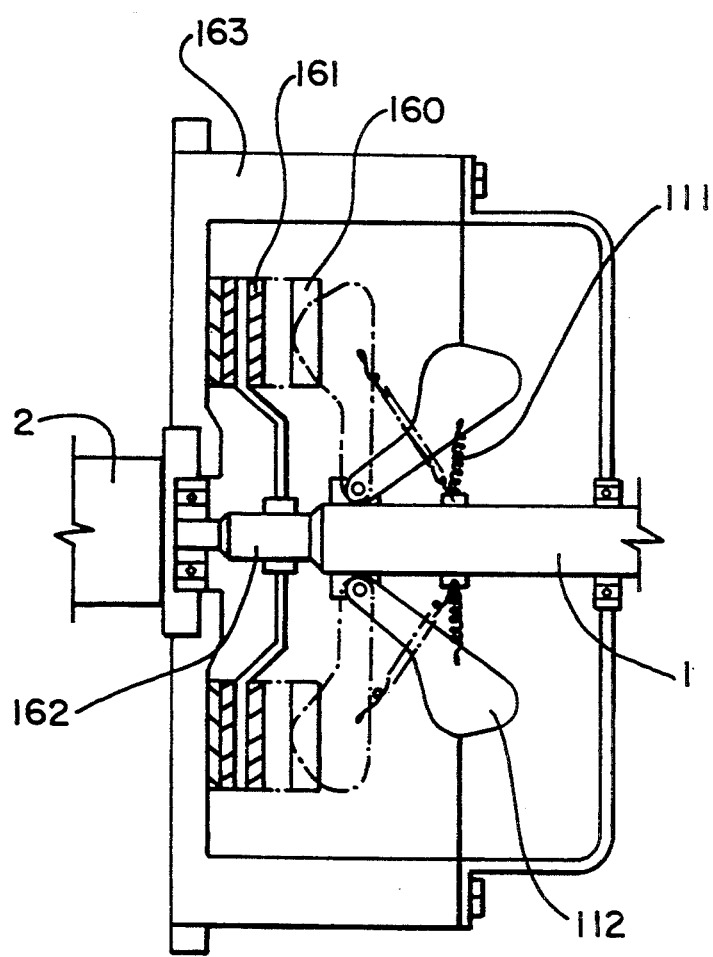
FIG. 14 is a sectional view of a power transmission device having a conventional coil type clutch cooperating with the hinged compressing wings in accordance with a further embodiment of the present invention.

In addition, the same result as that described for the primary embodiment can be achieved by a conventional coil type clutch combined with the hinged compressing wings 112 as shown in FIG. 14. In this embodiment of FIG. 12, the engine output shaft 1 is integrally formed with a spline shaft 162 on which a clutch disc 161 is tightly mounted. The power transmission device further includes a fly wheel 163 which is rotatably mounted on the distal end of the spline shaft 162 and intermittently rotated by the rotational force of the engine output shaft 1. This fly wheel 162 is connected to the gear box input shaft 2 such that its rotation causes the rotation of the input shaft 2. In addition, a compressing plate 160 is provided at a side of the clutch disc 161 and the compressing wings 112 are hinged to the engine output shaft 1. When the engine is started, the rotating output shaft 1 generates the centrifugal force, thereby causing the fully narrowed compressing wings 112 to be slowly spread out while overcoming the spring force of the compression coil spring 111. As the rotational speed of the engine output shaft 1 is increased, the centrifugal force is also increased, so that the compressing wings 112 intend to stand erect on the output shaft 1. Thus, the free ends of the compressing wings 112 come into contact with the compressing plate 160 and bias the plate 160 toward the clutch disc 161. As a result, the clutch disc 161 is biased by the compressing plate 160 and comes into tight contact with the inner surface of the fly wheel 163. At this time, the clutch disc 161 integrated with the spline shaft 162 is rotated along with the engine output shaft 1, so that the rotational force of the engine output shaft 1 is transmitted to the fly wheel 163 through the rotating clutch disc 161 and in turn transmitted to the gear box input shaft 2.

In accordance with the above embodiment, the hinged compressing wings 112 slowly start its biasing operation for the compressing plate 160 in accordance with the number of revolutions of the engine output shaft 1, thereby remarkably reducing the starting load of the engine.

As described above, the power transmission device in accordance with the present invention comprises a planetary gear drive provided between the engine output shaft and the gear box input shaft to intermittently transmit the rotational force of the output shaft to the gear box input shaft. The planetary gear drive comprises a sun gear integrally provided at the distal end of the engine output shaft. A plurality of planetary gears gear with both the sun gear and an internal gear in the conventional manner. The plurality of planetary gears are rotatably mounted on a planetary gear carrier which is connected to the gear box input shaft. In accordance with an embodiment of the present invention, the internal gear achieves the fixed state or the slip state by the circulating fluid under pressure outputted from a hydraulic pump cooperating the engine output shaft.

In accordance with another embodiment of the present invention, the fixed state and the slip state of the internal gear are achieved by a plurality of hinged compressing wings which are hinged to the engine output shaft. These compressing wings are biased by individual compression springs and spread out by the centrifugal force to compress the internal gear to achieve the power transmission.

The plurality of compressing wings are slowly turned about individual hinged connections to be spread out while overcoming the spring force of the coil springs by the centrifugal force generated by the rotation of the engine output shaft. Here, the compressing wings intend to stand erect on the engine output shaft due to the centrifugal force imparted thereto, thereby compressing a side surface of the internal gear and achieving the slip state or the fixed state of the internal gear. Hence, the rotational force of the engine output shaft is transmitted to the planetary gears and causes these planetary gears to rotate and revolve round the sun gear. The revolution of the planetary gears in turn causes the rotation of the planetary gear carrier, thus achieving the power transmission from the engine output shaft to the gear box input shaft. In this case, the power transmission is slowly achieved in accordance with the level of the centrifugal force which is proportional to the number of revolutions of the engine output shaft, thus remarkably reducing the starting load of the engine. When the power transmission device of this invention is adapted to a conventional automatic clutch device, the clutching operation is carried out by the mechanical clutching method of the direct type other than the conventional hydraulic clutching method of the indirect type, thereby remarkably reducing the fuel consumption.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power transmission method for transmitting a rotational force of an engine output shaft to an input shaft of a transmission gear box comprising the step of:
   circulating fluid under pressure delivered from a first hydraulic pump in response to rotation of said engine output shaft in transmission of said rotational force.

2. The power transmission method according to claim 1, wherein the transmission of the rotational force is carried out by employing a planetary gear drive and by changing the state of an internal gear of said planetary gear drive between a rotatable state, a slip state and a fixed state by said circulating fluid under pressure delivered from said engine output shaft in accordance with the number of revolutions of said engine output shaft.

3. The power transmission method according to claim 2, wherein said state changing of said internal gear during traveling of a vehicle is controlled in accordance with a pressure difference between said circulating fluid under pressure delivered in proportion to the number of revolutions of said engine output shaft and a circulating fluid under pressure delivered in proportion to the number of revolutions of said gear box input shaft.

4. The power transmission method according to claim 2, wherein said circulating fluid under pressure, delivered in proportion to the number of revolutions of said engine output shaft, is delivered from said first hydraulic pump by a rotational force of a gear mechanism operated in response to rotation of said engine output shaft.

5. The power transmission method according to claim 4, wherein said state changing of said internal gear is controlled by proportionally acting said circulating fluid under pressure, delivered from said first hydraulic pump in proportion to the number of revolutions of said engine output shaft, on a radial flange integrally extending from the outer surface of said internal gear.

6. The power transmission method according to claim 2, wherein a sun gear of said planetary gear drive is fixed to said input shaft and a planetary gear carrier of said planetary gear drive is fixed to said engine output shaft.

7. The power transmission method according to claim 2, wherein a sun gear of said planetary gear drive is fixed to said engine output shaft and a planetary gear carrier of said planetary gear drive is fixed to said input shaft.

8. The power transmission method according to claim 7, wherein said state changing of said internal gear is controlled by proportionally acting said circulating fluid under pressure, delivered from said first hydraulic pump in proportion to the number of revolutions of said engine output shaft, on a radial flange integrally extending from the outer surface of said internal gear.

9. The power transmission method according to claim 1, wherein said circulating fluid under pressure, delivered from said first hydraulic pump in proportion to the number of revolutions of said engine output shaft, is supplied to a hydraulic cylinder connected between a clutch pedal and a clutch through a clutch operating link, thereby operating said clutch.

10. A power transmission device for intermittently transmitting the rotational force of an engine output shaft to an input shaft of a transmission gear box comprising:

a planetary gear drive comprising:
a sun gear mounted on said engine output shaft to be rotated at the same time of rotation of said engine output shaft;
a plurality of planetary gears gearing with said sun gear, said planetary gears being rotatably mounted on a planetary gear carrier;
an internal gear gearing with said plurality of planetary gears, said internal gear being selectively changed in its state between a rotatable state, a slip state and a fixed state; and
said planetary gear carrier rotatably supporting said plurality of planetary gears and tightly connected to said input shaft such that it rotates said input shaft when it is rotated by the rotational force of said engine output shaft; and
means for changing the state of said internal gear of said planetary gear drive between the rotatable state, the slip state and the fixed state by a circulating fluid under pressure proportionally delivered in accordance with the number of revolutions of said engine output shaft.

11. The power transmission device according to claim 10, wherein said state changing means comprises:
a first gear mechanism mounted on said engine output shaft such that it is rotated at the same time of the rotation of said engine output shaft;
a first hydraulic pump connected to said first gear mechanism so as to output a circulating fluid under pressure in accordance with the rotation of said engine output shaft;
a second gear mechanism mounted on said input shaft such that it is rotated at the same time of rotation of said input shaft;
a second hydraulic pump connected to said second gear mechanism so as to output a circulating fluid under pressure in accordance with the rotation of said input shaft;
at least one radial flange integrally extending from the outer surface of said internal gear of the planetary gear drive; and
a hydraulic cylinder for compressing, using the circulating fluid under pressure of said first hydraulic pump, said radial flange of the internal gear, said hydraulic cylinder being controlled in its flange compressing force in accordance with a pressure difference between the circulating fluid under pressure of said first pump and the circulating fluid under pressure of said second pump.

12. The power transmission device according to claim 11, wherein said radial flange comprises:
an axial cylinder axially extending from said internal gear; and
a plurality of spaced radial flanges radially outwardly extending from said axial cylinder.

13. The power transmission device according to claim 10, wherein said hydraulic cylinder further includes a compressing pad for compressing said radial flange of the internal gear, said compressing pad being hinged to a piston rod of said hydraulic cylinder such that it is changed in its position with respect to said radial flange.

14. The power transmission device according to claim 10, further comprising:
a flow control valve for controlling the flow of the circulating fluid under pressure applied from said first hydraulic pump to said hydraulic cylinder;
a main hydraulic passage connected between said first hydraulic pump and said flow control valve to supply said circulating fluid under pressure of the first hydraulic pump to said hydraulic cylinder under the flow control of said flow control valve; and
a branch hydraulic passage and a second hydraulic passage connected between said first and second hydraulic pumps and said flow control valve to supply the circulating fluid under pressures of said first and second hydraulic pumps to said flow control valve, respectively, so as to cause said flow control valve to control the flow of said circulating fluid under pressure of said first hydraulic pump in accordance with said pressure difference between the circulating fluids under pressure of said first and second pumps, 15. The power transmission device according to claim 14, wherein said flow control valve comprises:
a ball valve rotatably encased in a valve body, said ball valve having a radial blade and a through hole, said through hole being diametrically formed in said ball valve and having the same size as the inner size of said main hydraulic passage; and
a cavity provided above said ball valve in said valve body, said cavity being divided by said blade into a first hydraulic chamber communicating with said second hydraulic passage and a second hydraulic chamber communicating with said branch hydraulic passage, thereby rotating said ball valve in accordance with the pressure difference between the circulating fluid under pressures of said first and second pumps so as to cause the flow control of said ball valve.

* * * * *